United States Patent [19]

Dunn et al.

[11] 4,026,379
[45] May 31, 1977

[54] MULTI-POSITIONAL SEAT HAVING A FOLLOWING INSTRUMENT PANEL

[75] Inventors: Robert C. Dunn, Lockport; Joseph M. Jania, Bolingbrook, both of Ill.

[73] Assignee: International Harvester Company, Chicago, Ill.

[22] Filed: Nov. 26, 1975

[21] Appl. No.: 635,501

[52] U.S. Cl. .............................. 180/77 S; 296/65 R
[51] Int. Cl.² ......................................... B60N 1/02
[58] Field of Search ............. 180/77 R, 77 S, 89 R; 296/65 R

[56] References Cited

UNITED STATES PATENTS

| 2,796,140 | 6/1957 | Knolle | 180/77 S |
|---|---|---|---|
| 3,039,553 | 6/1962 | Van Der Lely et al. | 180/77 S |
| 3,088,537 | 5/1963 | Tourneau | 180/77 S |
| 3,223,193 | 12/1965 | Reynolds et al. | 180/77 S |
| 3,315,758 | 4/1967 | Allen | 180/1 R |
| 3,696,880 | 10/1972 | Bobard | 180/77 R |
| 3,720,047 | 3/1973 | Van Der Lely | 180/77 S |
| 3,747,723 | 7/1973 | Peterson et al. | 180/77 S |
| 3,791,052 | 2/1974 | Van Der Lely | 180/1 R |
| 3,893,728 | 7/1975 | Holopainen | 180/77 S |

*Primary Examiner*—Joseph F. Peters, Jr.
*Assistant Examiner*—J. D. Rubenstein
*Attorney, Agent, or Firm*—Douglas W. Rudy; Floyd B. Harman

[57] ABSTRACT

Parallel linkage supporting a seat and an instrument panel in a vehicle allow the seat and panel to be moved together to a distant operating location.

8 Claims, 5 Drawing Figures

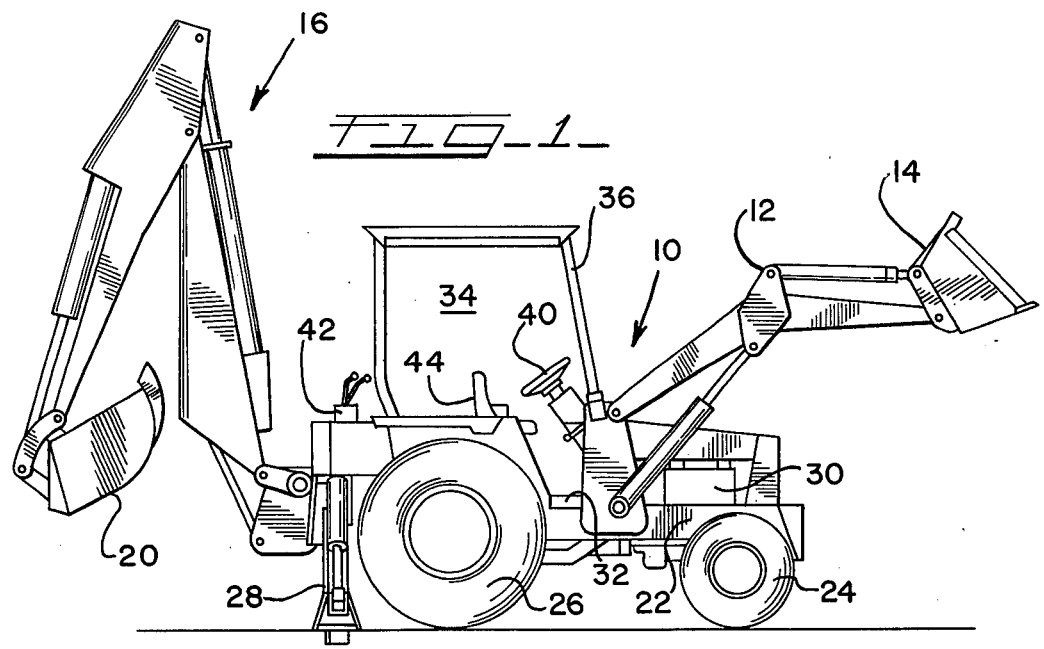
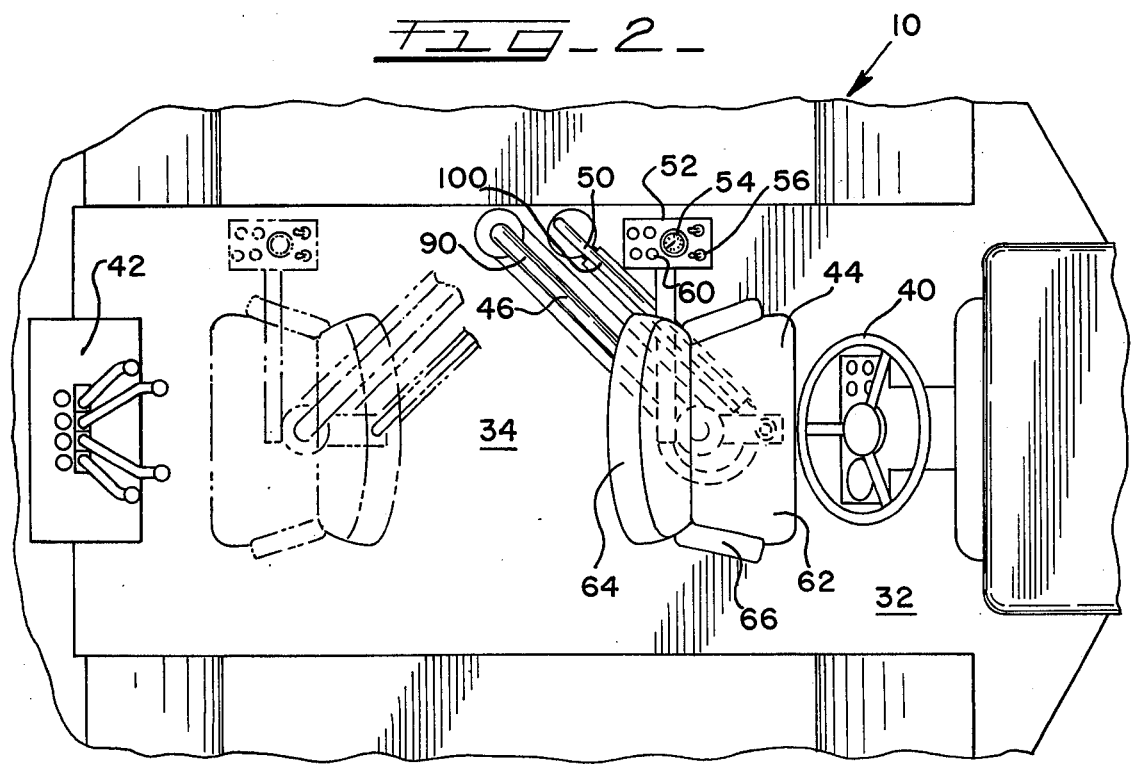

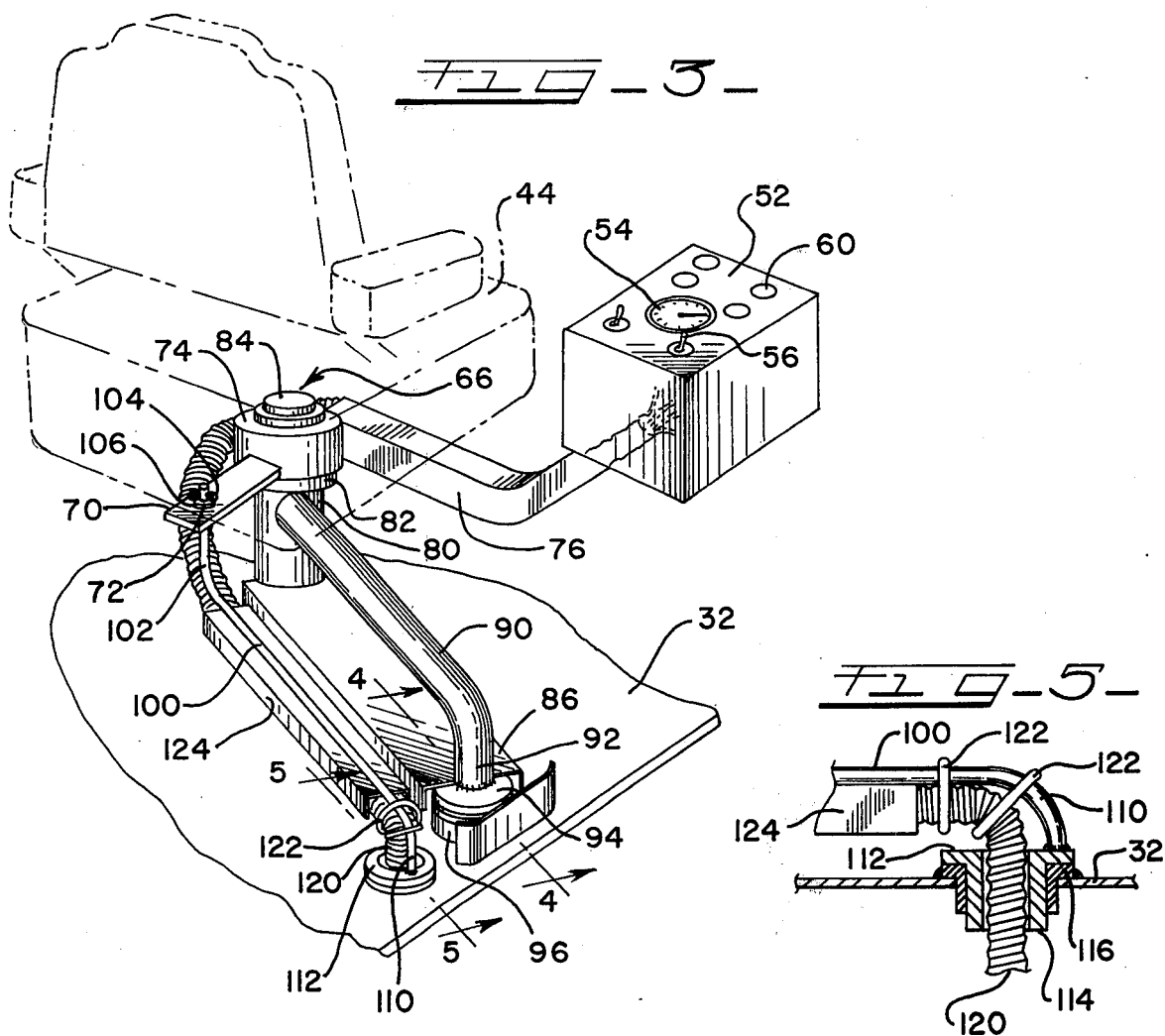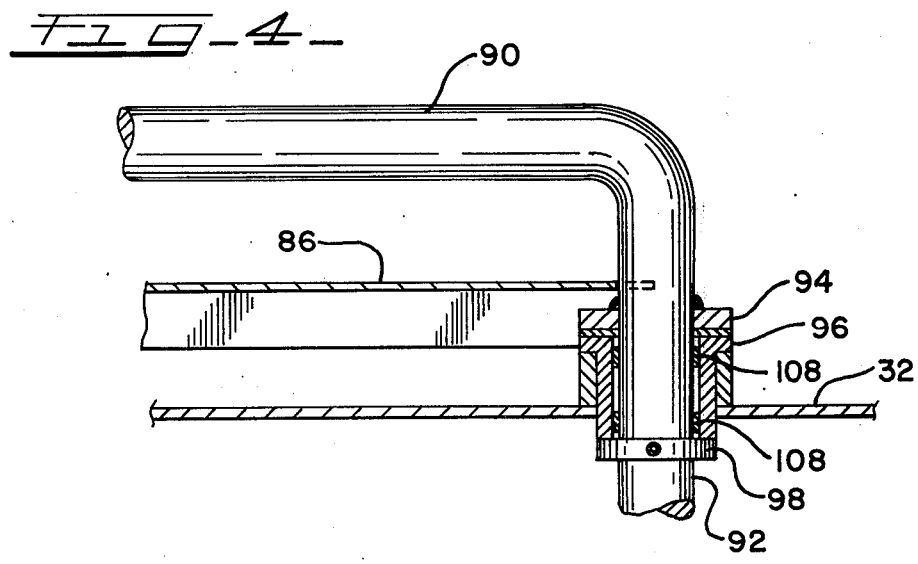

MULTI-POSITIONAL SEAT HAVING A FOLLOWING INSTRUMENT PANEL

BACKGROUND OF THE INVENTION

1. Field of the Invention

This invention has to do with seats for accommodating operators in vehicles. Specifically the seat may be highly adaptable for use in industrial tractors having a front loader and a backhoe. The seat is mounted on a parallel linkage system which allows an instrument panel to accompany the seat as it moves from one position to another position.

2. Description of the Prior Art

In the specific example of excavating equipment such as those commonly called "loader-backhoes" it has been necessary to provide provisions for accommodating the vehicle operator when the vehicle is being used as a loader or conversely as a backhoe.

The loader portion of a loader backhoe is the portion mounted to operate at the front of the vehicle. In a conventional loader backhoe the front of the vehicle generally houses the vehicle engine as well as the steerable wheels of the vehicle. The backhoe portion of the vehicle generally is mounted at the rear of the vehicle which usually supports the traction wheels of the vehicle.

The evolution of the loader backhoe saw a conventional tractor first equipped with an add-on loader. From this point it became obvious to provide a trench digging unit, a "backhoe", to augment the loader at the front of the vehicle.

As the conventional tractor evolved into loader-backhoes it became obvious that the vehicle operator could not operate the equipment at either end of the vehicle from a centrally located seat. Thus, early loader backhoes were provided with two seats. One seat was in the conventional position behind the steering wheel and was used when operating a loader and the other seat was located on the aft portion of the vehicle. The seat at the aft portion of the vehicle was usuallly attached to and provided with the backhoe attachment. It was usually impossible to operate the vehicle from the backhoe operating seat.

The next relevant evolutionary item in the development of the seating arrangement of the loader backhoe was to use a single seat that could be flipped over from a forward facing position to convert into a rearward facing position. Oftentimes the podium supporting the seat was designed to allow different elevations between the forward facing position and the rearward facing position. Thus, when the seat was forward to either transport the vehicle or dig with the front end loader the seat would be at a normal elevation. This was necessary as the vehicle operator in these instances needed to be able to operate foot pedal controls such as brakes and clutches. However, when the tractor was being used as a backhoe the operator did not need to be able to reach the clutch and brake pedals but higher elevation did assist him in seeing what he was digging with his backhoe.

In a flip-flop seat of the type described it was also common to have the cushion portion of the seat also act as the backrest portion when the seat had been positioned to the backhoe operating position. Of course when the seat was in the normal position the seat cushion resumed its normal functions as did the backrest. A Self Positioning Seat, U.S. Pat. No 3,747,723 of Peterson et. al. of the same assignee as this invention may be considered the forerunner of the invention presented herein. In U.S. Pat. No. 3,747,723 a pivoting seat is shown which may be construed as very similar to the seat part of this invention. However, this invention is directly concerned with the mounting of an instrument panel to the seat swivel mechanism such that the panel follows the seat to any location to which the seat is moved.

The instant invention, wherein the seat pivots on a parallel linkage from one position to another position while taking the instrument panel along with it, is obviously different from the type of multi-position seats formerly in use on loader-backhoes.

The prior art seat configurations are somewhat deficient in light of the seat herein presented. For instance the use of two seats where only one seat is used at any time is redundant and leads to costly duplication of equipment. The flip-flop type seats, although an improvement over the two seat arrangement does not provide for the use of one set of vehicle monitoring gauges and instruments.

SUMMARY OF THE INVENTION

The multi-position seat of this invention has the advantage of the accompanying instrument panel that moves with the seat as it is preferenced from a forward operating position to a rearward operating position.

The mechanism depends on a parallel linkage which supports the seat as well as providing a pivot point for the seat. Mounted to and controlled by the parallel linkage is a bell crank assembly having a first arm attached to one of the pair of parallel links and a second arm that supports an instrument panel. A second parallel link supports the vehicle seat. As the vehicle seat is preferenced through its arcuate path from one position to another the second link of the parallel linkage will control the positional displacement of the second bell crank arm which supports the instrument panel.

The instrument panel will always follow the seat regardless of the position of the seat.

An advantage of this seat and panel arrangement is that only one basic instrument panel need be provided on the vehicle to inform the vehicle operator of the operating status of the vehicle regardless of which end of the tractor the operator is working with. The operator will be fully informed at all times without being inconvenienced by having to "crane his neck" to read operating monitors which may be mounted at the opposite work station. Typically engine monitors are mounted in the proximity of the vehicle steering wheel and are distant from the operator working at the backhoe end of a loader backhoe.

Another advantage of this invention is that only one seat needs to be provided for use at a plurality of possible seating positions.

BRIEF DESCRIPTION OF THE DRAWINGS

These and other advantages of this seat and panel combination will be apparent upon perusal of following description and drawings.

FIG. 1 presents an elevation view of an industrial tractor of the type incorporating this invention having a loader mounted to the front end thereof and a backhoe mounted to the rear end thereof;

FIG. 2 is a plan view of the environment of the seat of the invention shown in a forward facing position and a rearward facing position (broken line embodiment);

FIG. 3 is a perspective view of the supporting structure and instrument panel of the invention;

FIG. 4 is a view of a portion of the supporting structure as taken through line 4—4 of FIG. 3;

FIG. 5 is a view of a portion of the seat supporting structure as taken through line 5—5 of FIG. 3;

DESCRIPTION OF THE PREFERRED EMBODIMENTS

Looking first at FIG. 1 a relatively conventional industrial tractor generally 10 is presented. Mounted to the tractor and projecting forward is a loader assembly 12 having a boom and operating cylinders for controlling a bucket 14. A backhoe generally 16 including a boom and dipper stick as well as operating cylinders for manipulating a backhoe bucket 20 is mounted to the rear portion of the tractor 10. The industrial tractor shown, which may alternatively be a general purpose tractor, has a main frame 22 which may support such items as the front steering wheels, one shown as 24 the rear traction wheels one shown as 26, an engine means 30 as well as stabilizing outriggers 28. Also carried by frame 22 is a floor 32 that supports equipment in the operator's work zone 34. This work zone is provided with a rollover protective structure 36, a steering wheel 40, backhoe controls 42 and a seat 44 for accommodating the vehicle operator. The seat 44 is shown in the forward facing position.

The plan view of FIG. 2 shows the basic embodiment of the invention relatively clearly. Shown as the operator's work zone 34 is a portion of the tractor 10 including the floor 32, the steering wheel 40, the backhoe controls 42. The seat mechanism includes a seat 44 a seat arm assembly 46 and a control arm 50, an instrument panel 52. The instrument panel may have gauges 54, operating switches 56 and warning lights such as the one shown as 60, or any arrangement of vehicle monitoring or controlled equipment as desired.

As the seat 44 is not a departure from prior art seats it will not be discussed in detail except to say that it may have a frame (not shown), for allowing it to be mounted to the seat supporting structure, as well as a cushion 62, a backrest 64, and an armrest, one shown as 66.

An even more definitive presentation of the seat supporting structure of this invention can be seen in FIG. 3. Note that the seat 44 is shown in a broken line view in position above the general support structure. The structure is carried by the floor 32 partially shown in FIG. 3.

The apparatus of importance in FIG. 3 includes the panel 52, or more properly, the instrument panel. This may be a generally rectangular box-like structure having a top, sides and a bottom with the top surface supporting any of a variety of instruments including such items as gauges 54, operating switches or levers 56, or warning lights such as 60. Of course, any type of controlling or monitoring equipment could be housed in this panel at the discretion of the vehicle designer. Additionally, other designs or configurations of instrument panels could be substituted for the panel as shown. For example, a logical improvement would be to provide a lockable and weather-proof structure for protecting the panel 52.

A panel arm assembly, generally 66 is composed of a first arm 70, having a bushing equipped aperture at 72; a central body 74 formed as a collar to which the first arm 70 and the second 76 are fixedly attached, as by welding. The second arm 76 may be a hollow tube, such as shown in FIG. 3 formed by bending to support the panel 52 in a position that will be within the usual sphere of the vehicle operator's control.

Note that the first arm 70, the second arm 76 and the central body are related to each other such that a bell crank geometry is provided. The second arm 76 projects away from the central body 74 at an approximate right angle to the projections of the first arm 70. The hollow interior of the collar making up the central body 74 may be fitted with a bushing (not shown) to provide a bearing surface.

The panel arm assembly 66 is carried on a housing 80. This housing 80 is relatively tubular in shape and has an outside diameter substantially corresponding to the inside diameter of the central body 74. The housing 80 is further equipped with a retainer collar 82 which may be welded thereto that acts as a limiting device and a bearing surface to limit the penetration of the housing into the central body 74 of the panel arm assembly 66. The bottom surface of the central body 74 rests on a top surface of the retainer collar 82 and a bearing relationship is created such that the panel arm assembly 66 can be pivoted around the housing 80.

The housing 80 may also be machined on its inner surface in order to allow containment and pivotability of a seat frame mounting axle 84. The seat frame mounting axle allows the frame of the seat (not shown) to be pivotally carried by the housing 80. The seat, via the seat frame, would be mounted to the axle 84 by convenient means such as fasteners or a weldment.

The housing 80 is further fixedly attached to a seat arm assembly. This seat arm assembly may have a lower link 86 as well as an upper link 90. In this preferred embodiment the upper link 90 is fixedly attached at a first end to the housing 80 and progresses horizontally away from the housing for a short distance where the link is deformed perpendicularly to the horizon such that the second end 92 of the upper link projects through the floor 32 of the vehicle. The second end 92 of the upper link is equipped with a limiting collar 94. The aperture in the floor 32 of the vehicle may be provided with a flanged sleeve 96 (See also FIG. 4) where the top surface of the flange of the flange sleeve may become a bearing surface that when in contact with the bottom of the limiting collar 94 of the upper link, not only checks the penetration of the upper link 90 into the flanged sleeve 96, but also provides a bearing surface which adds in smooth pivoting action of the upper link 90 in the flanged sleeve 96. The flanged sleeve may also be equipped with internal bushings 108 (two shown) that are substantially equivalent in inside diameter to the outside diameter of the lower part 92 of the upper link 90 such that the upper link is supported vertically in the flanged sleeve 96. In order to prevent the lower end 92 of the upper link from being pulled out of the flanged sleeve 96 the lower end 92 of the link, which may project past the lower termination point of the flanged sleeve 96, could be equipped with a locking ring 98. This locking ring or an equivalent thereof, such as a locking pin, would be highly desirable in order to ensure that integrity between the seat and the vehicle in the case of vehicle upset.

Returning to the seat arm assembly, and specifically the lower link 86 thereof as shown in FIG. 3 it is noted that the lower link 86 would be fixedly attached to the housing 80 at one end and the second end 92 of the upper link 90. Although this double link system of a seat arm assembly is shown it is obvious that a single link having a portion to insert into the flanged sleeve 96 may work as well in supporting the housing 80 as this double link system. The lower link 86 may act as a guard to protect an operating cable (not shown) that may be run between the housing 80 and the collar 94.

With the seat housing provision discussed above it is apparent that the operator of the vehicle could position the seat at a forward facing direction as shown by the solid line representation in FIG. 2. Alternatively the operator could manually push the seat assembly (pivoting in the flanged sleeve 96) to enable him to work with backhoe controls 42. After he pushed the seat assembly from one position to the other he would have to manually swivel or rotate the seat to face the correct direction. However, in order to ensure that the instrument panel 52 will appropriately transfer positions with the seat without detriment to the attendant panel wiring a link parallel to the seat arm assembly is provided.

Looking again at FIG. 3, a control arm 100 having a major portion horizontally disposed relative to the floor 32 is provided. A first end 102 of said control arm is upturned such that it is vertical in respect to the floor and is threaded through the bushed aperture 72 of the first arm 70. A washer is welded to the control arm to prevent excessive penetration of the control arm through the aperture. Further, the first end of the control arm is drilled through to accept a cotter pin 104 which bears on a washer 106 thus preventing the first end 102 of the control arm 100 from falling out the aperture in the first arm 70.

The control arm has a second end 110 which is fixedly secured to the top surface 112 of a mounting sleeve 114 which passes through the floor 32. This mounting sleeve has a flanged top surface 112 as part of a tube or sleeve 114 having a hollow center section of relatively large diameter. This mounting sleeve 114 is pivotally carried inside the sleeve housing 116 which is carried in the floor of the vehicle. The top projecting edge of the sleeve housing 116 supports the flanged top surface of the mounting sleeve 114 from the bottom thereof. The mounting sleeve can thus rotate freely in the sleeve housing 116.

An instrument panel wiring harness 120 is provided to allow conduits from the tractor vehicle to the instrument panel 52. The wiring harness 120 originates from below the floor 32 (see FIG. 5) and passes through the mounting sleeve 114. The harness 120 follows the control arm 100 to the point where the control arm bends upward and then passes around the housing 80 and into the inside of the tube of the second arm 76 to the panel 52. Attachment means such as the straps shown by 122 are used to hold the wiring harness 120 in position relative to the control arm 100. In order to protect the wiring harness 120 from damage it may be covered along part of its path by a protective plate 124.

Thus it is apparent that there has been provided in accordance with the invention and instrument panel that will follow a swivelable seat that fully satisfies the objects, aims and advantages as set forth above. While the invention has been described in conjuction with specific embodiments thereof it is evident that many alternatives, modifications and variations will be apparent to those skilled in the art in light of the foregoing description. Accordingly it is intended to embrace all such alternatives, modifications and variations as fall within the scope of the appended claims.

What is claimed is:

1. In a vehicle having implements attached to both ends thereof, an assembly for mounting an instrument panel and a rotatable seat for movement between two longitudinally spaced work stations, said seat being rotatable independently of said control panel, the assembly comprising:
    a flanged sleeve located in the floor structure of said vehicle;
    a seat arm assembly having one end pivotally carried by said flanged sleeve and a second end terminating as a flanged housing having a verticle bore;
    a panel arm assembly having a first arm, a central body, and a second arm all of which are pivotally mounted to the second end of said seat arm assembly;
    a seat frame mounting axle pivotally carried in the flanged housing of the seat arm assembly to which said seat may be fixedly attached;
    a sleeve housing is located in the floor structure of said vehicle adjacent to said flanged sleeve;
    a control arm having one end pivotally carried by said sleeve housing and a second end of said control arm pivotally retained on the first arm of said panel arm assembly;
    a panel carried on said second arm of said panel arm assembly.

2. The invention in accordance with claim 1 wherein said assembly further comprises:
    said panel being an instrument panel equipped with telltale instruments and switches germain to the operating condition of said vehicle; and
    an instrument panel wiring harness emanating from the vehicle and passing said housing, along said control arm and along said second arm to said instrument panel.

3. The invention in accordance with claim 1 wherein said assembly further comprises:
    said panel being a control panel equipped with operating control handles for controlling operating mechanisms of said vehicle;
    a control panel service harness emanating from the vehicle and following said control arm and said second arm to said control panel and thereat associated with said operating control handles.

4. In a vehicle having an assembly adapted to support a seat that can be positioned to facilitate the operation of implements at either end of the vehicle the improvement comprising:
    a flanged sleeve mounted to the structure of said vehicle;
    a seat arm assembly comprising a horizontal member pivotally carried at one end to said flanged sleeve;
    a housing having a vertical aperture therethrough and further having the other end of said horizontal member of said seat arm assembly fixedly attached thereto;
    a panel arm assembly having a central body, a first arm having an aperture fixedly attached to said central body and a second arm fixedly attached to said central body, both arms arranged on said central body to form a bell crank geometry wherein said central body is pivotally mounted to said housing;
    a sleeve housing having a central aperture mounted to the structure of said vehicle;
    a first end of a control arm fixedly attached to said sleeve and a second end of said control arm pivotally mounted to said first arm of said panel arm assembly through said aperture in said first arm;

a panel means mounted to said second arm of said panel arm assembly;

a wiring harness emanating from said vehicle and passing to said panel via said control arm and said second arm.

5. The invention in accordance with claim 4 wherein said seat arm assembly and said control arm are arranged in parallel relationship by having the axial center of said sleeve housing in the same longitudinal plane in respect to the longitudinal plane of the vehicle as the axial center of said flanged sleeve; and further said distance from the axial center point of said flanged sleeve to the axial center point of said vertical aperture of said housing is substantially identical to the distance from the axial center point of said sleeve housing to the axial center point of said aperture in said first arm of said panel arm assembly which accommodates said control arm whereby said seat arm assembly and said control arm constitute a parallel linkage whereby displacement of said seat arm assembly will result in displacement of said panel means due to the association of said second arm to said central body and said first arm of said panel arm assembly.

6. The invention in accordance with claim 5 wherein said panel means mounted to said second arm of said panel arm assembly will remain on the flanged sleeve side of said housing as said second arm projects from its attaching point in a direction toward the side of the vehicle having said flanged sleeve.

7. The invention in accordance with claim 5 wherein said panel means mounted to said second arm of said panel arm assembly will remain displaced on the opposite side of said housing from said flanged sleeve as said second arm projects from its attaching point in a direction away from said seat arm assembly.

8. In a vehicle having excavating equipment carried at each end thereof and a single seat mounted to be movable from a forward facing position at a first work station to a rearwardly facing position at a second work station that is longitudinally spaced from said first work station on the structure of the vehicle an improvement in the seat assembly comprising:

a flanged sleeve having bearing means carried by the structure of said vehicle;

a seat arm assembly having an upper horizontal link terminating in a vertically disposed end portion which may be fitted into said flanged sleeve and a lower horizontal link weldably secured to the vertically disposed end portion of said upper link, the vertically disposed end of said upper link further being equipped with the collar welded thereto to limit the penetration of said upper link into said flanged sleeve;

a housing having a hollow interior weldably affixed to the upper and lower horizontal links of the seat arm assembly, said housing having an external collar welded thereto above the attaching point of the upper link;

a seat frame mounting axle pivotally carried in said housing;

a panel arm assembly having a first arm welded to a central body and a second arm welded to said central body to form a bell crank type lever, said central body having an inside diameter substantially equivalent to the outside diameter of the upper portion of said housing such that when said central body is positioned over said housing it will be supported near the top of said housing as it will rest upon the upper surface of said external collar of said housing, said first arm further having an aperture therethrough and said second arm being formed of hollow tubing;

a sleeve housing having bearing means carried by the structure of said vehicle;

a control arm having a first end comprising a flanged hollow tube capable of being carried by said sleeve housing further having a rod portion extending initially upward from said flanged hollow tube then progressing horizontally parallel to said seat arm assembly and terminating in an upwardly extending portion which is adapted to pass through said aperture of said first arm of said panel arm assembly, the upwardly extending portion equipped with a washer welded thereto checking the penetration of said rod into said aperture, said rod further having an aperture through the minor axis thereof to allow the insertion of a cotter pin to prevent said rod from falling out of said aperture of said first arm;

an instrument panel housing a plurality of instruments which may indicate and control the state of the operation of the vehicle; and an instrument panel wiring harness containing a plurality of conduits emanating from said vehicle and following a path from said sleeve housing, along said control arm, around said housing, through said second arm and into said panel where the appropriate panel instruments will be attached to appropriate conduits of said wiring harness;

a seat having a frame supporting a cushion portion, a backrest portion and an armrest portion wherein said seat frame is pivotally mounted to said seat frame mounting axle carried in said housing of said seat assembly and may be pivoted thereon whereby said seat assembly can be moved from a forward facing position with the instrument panel on the flanged sleeve side of the seat assembly to a rearwardly facing position with the instrument panel remaining on the flanged sleeve side of the seat assembly due to the parallel linkage of said seat arm assembly and said control arm in relationship to said bell crank of said panel arm assembly.

* * * * *